US011575178B2

(12) United States Patent
Fu et al.

(10) Patent No.: US 11,575,178 B2
(45) Date of Patent: Feb. 7, 2023

(54) SEPARATOR AND LITHIUM ION BATTERY

(71) Applicant: Ningde Amperex Technology Limited, Fujian (CN)

(72) Inventors: Yunyun Fu, Fujian (CN); Tao Tao, Fujian (CN); Zhongxu Wang, Fujian (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

(21) Appl. No.: 16/292,385

(22) Filed: Mar. 5, 2019

(65) Prior Publication Data

US 2020/0168872 A1 May 28, 2020

(30) Foreign Application Priority Data

Nov. 22, 2018 (CN) .......................... 201811400179.4

(51) Int. Cl.
*H01M 10/0525* (2010.01)
*H01M 10/0587* (2010.01)
*H01M 50/409* (2021.01)

(52) U.S. Cl.
CPC ..... *H01M 50/409* (2021.01); *H01M 10/0525* (2013.01); *H01M 10/0587* (2013.01)

(58) Field of Classification Search
CPC ............... H01M 2/16; H01M 10/0525; H01M 10/0587; H01M 50/409
See application file for complete search history.

(56) References Cited

U.S. PATENT DOCUMENTS

| 2008/0292968 A1* | 11/2008 | Lee ...................... H01M 10/052 429/247 |
| 2011/0206973 A1* | 8/2011 | Brant .................. H01M 50/494 264/45.1 |

(Continued)

FOREIGN PATENT DOCUMENTS

| CN | 204680713 U | 9/2015 |
| CN | 206422131 | 8/2017 |

(Continued)

OTHER PUBLICATIONS

Nad New Energy Technology Co. LTD.; Office Action for Chinese patent application No. 201811400179.4, dated Dec. 27, 2021, 15 pgs.

*Primary Examiner* — Osei K Amponsah
(74) *Attorney, Agent, or Firm* — Taylor English Duma LLP

(57) ABSTRACT

An aspect of the present application provides a separator comprising a porous substrate, and a first coating layer disposed on at least one surface of the porous substrate and comprising an inorganic particle and a binder. The first coating layer comprises a first region and a second region, the first coating layer in the first region comprises a first thickness, and the first coating layer in the second region comprises a second thickness; the first thickness is greater than the second thickness, and the area in the second region is greater than the area in the first region. Another aspect of the present application provides a lithium ion battery comprising a positive electrode, a negative electrode and the above separator. The purpose of the present application is to provide a separator having an increased thickness in a partial coating layer and a lithium ion battery comprising the above separator.

17 Claims, 2 Drawing Sheets

(56) References Cited

U.S. PATENT DOCUMENTS

| | | | | |
|---|---|---|---|---|
| 2015/0162588 A1* | 6/2015 | Lee | ................... | H01M 2/1653 |
| | | | | 429/145 |
| 2015/0171396 A1* | 6/2015 | Okuno | ................ | H01M 50/431 |
| | | | | 701/22 |

FOREIGN PATENT DOCUMENTS

| | | |
|---|---|---|
| CN | 207217641 U | 4/2018 |
| JP | 2010176901 | 8/2010 |

* cited by examiner

SEPARATOR AND LITHIUM ION BATTERY

CROSS-REFERENCE TO RELATED APPLICATION

This application claims priority to and benefits of Chinese Patent Application Serial No. 201811400179.4, filed with the China National Intellectual Property Administration on Nov. 22, 2018, and the entire content of which is incorporated herein by reference.

FIELD OF THE APPLICATION

The present application relates to the field of battery, in particular, to a separator and lithium ion battery.

BACKGROUND OF THE APPLICATION

The separator of lithium ion battery on the market is mainly a polyolefin separator, that is, a single layered separator in which polyethylene (PE), polypropylene (PP) or the like is used as the substrate, and a PP/PE/PP multilayered separator is also used. The melting temperature of the polyolefin is low (that of PE is about 130° C., that of PP is about 160° C.). In the abuse state (internal short circuit, external short circuit, hot box, overcharge, etc.), these separators of polyolefin are prone to heat shrinkage at high temperatures, which in turn causes extensive short circuits, exacerbates heat build-up, and causes thermal runaway to cause lithium-ion battery to be combusted and explosive. At present, the heat resistance of the separator is improved by coating the ceramic (inorganic layer) coating layer on the above polyolefin separator, and a cohesive polymer (organic layer) is applied to the separator, so that the internal short circuit of the lithium ion battery caused by the heat shrinkage of the separator and the misalignment between the electrodes can be prevented, and the safety performance of the lithium ion battery can be enhanced. At the same time, the positive electrode, the negative electrode and the separator can be binded together to increase the mechanical properties such as the rigidity of the lithium ion battery.

In the current, both the inorganic layer and the organic layer are uniformly coated on the entire surface of the polyolefin separator. Since the coating thickness is too uniform, the difference in the thickness of the coating layer between different parts of the lithium ion battery is neglected, and there is no special thickening in the danger zone (such as the corner of the lithium ion battery), thereby causing lack of local safety of lithium ion battery, ultimately reducing the overall safety of lithium ion battery.

To this end, there is an urgent need for a technical solution that can meet the different requirements for the thickness of the coating layer in different parts of the lithium ion battery.

SUMMARY OF THE APPLICATION

Aiming at existing problems in the prior art, the purpose of the present application is to provide a separator having an increased thickness in a partial coating layer and a lithium ion battery comprising the above separator.

In order to achieve the above purpose, an aspect of the present application provides a separator, comprising: a porous substrate; and a first coating layer disposed on at least one surface of the porous substrate; the first coating layer comprises an inorganic particle and a binder, the first coating layer comprises a first region and a second region, the first coating layer in the first region comprises a first thickness, and the first coating layer in the second region comprises a second thickness, the first thickness is greater than the second thickness, and the area in the second region is greater than the area in the first region.

According to some examples of the present application, wherein the first region and the second region are alternately disposed.

According to some examples of the present application, wherein the first coating layer in the first region further comprises the second thickness.

According to some examples of the present application, wherein the first coating layers of the first thickness are spaced apart.

According to some examples of the present application, wherein a distance between the first coating layers of the first thickness is 0.0005 to 5 mm.

According to some examples of the present application, wherein a difference between the first thickness and the second thickness is 0.2 to 5 μm.

According to some examples of the present application, wherein the second thickness is 0.2 to 20 μm.

According to some examples of the present application, wherein the separator further comprises a second coating layer, and the second coating layer comprises at least one of an inorganic particle or a binder.

According to some examples of the present application, wherein the first coating layer is disposed between the porous substrate and the second coating layer.

According to some examples of the present application, wherein the inorganic particle comprises at least one of inorganic particles comprising silica, alumina, titania, zinc oxide, magnesium oxide, hafnium dioxide, tin oxide, zirconium oxide, yttrium oxide, silicon carbide, boehmite, magnesium hydroxide, aluminum hydroxide, calcium titanate, barium titanate, lithium phosphate, lithium titanium phosphate, lithium lanthanum titanate.

According to some examples of the present application, wherein the separator further comprises a second coating layer, and the second coating layer comprises at least one of an inorganic particle or a binder, wherein the inorganic particle comprises at least one of inorganic particles comprising silica, alumina, titania, zinc oxide, magnesium oxide, hafnium dioxide, tin oxide, zirconium oxide, yttrium oxide, silicon carbide, boehmite, magnesium hydroxide, aluminum hydroxide, calcium titanate, barium titanate, lithium phosphate, lithium titanium phosphate, lithium lanthanum titanate.

According to some examples of the present application, wherein the binder comprises at least one of polymers comprising vinylidene fluoride-hexafluoropropylene copolymer, vinylidene fluoride-trichloroethylene copolymer, polyacrylic ester, polyacrylic acid, polyacrylate, polyacrylonitrile, polyvinylpyrrolidone, polyvinyl acetate, copolymer of ethylene-vinyl acetate, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, acrylonitrile-styrene-butadiene copolymer, polyvinyl alcohol, polyvinyl ether, polytetrafluoroethylene, polyhexafluoropropylene, styrene-butadiene copolymer and polyvinylidene fluoride.

According to some examples of the present application, wherein the separator further comprises a second coating layer, and the second coating layer comprises at least one of an inorganic particle or a binder, wherein the binder comprises at least one of polymers comprising vinylidene fluoride-hexafluoropropylene copolymer, vinylidene fluoride-trichloroethylene copolymer, polyacrylic ester, polyacrylic acid, polyacrylate, polyacrylonitrile, polyvinylpyrrolidone, polyvinyl acetate, copolymer of ethylene-vinyl acetate, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, acrylonitrile-styrene-butadiene copolymer, polyvinyl alcohol, polyvinyl ether, polytetrafluoroethylene, polyhexafluoropropylene, styrene-butadiene copolymer and polyvinylidene fluoride.

According to some examples of the present application, wherein the porous substrate is a polymer film, a multilayer polymer film, or a nonwoven fabric formed of any one or more of polymers comprising polyethylene, polypropylene, polyethylene terephthalate, polybutylene terephthalate, polyphthalamide, polyester, polyacetal, polyamide, polycarbonate, polyimide, polyetheretherketone, polyaryletherketone, polyetherimide, polyamideimide, polybenzimidazole, polyethersulfone, polyphenylene ether, cyclic olefin copolymer, polyphenylene sulfide and polyethylene naphthalene.

Another aspect of the present application provides a lithium ion battery, comprising: a positive electrode; a negative electrode; and a separator comprising a porous substrate and a first coating layer disposed on at least one surface of the porous substrate; the first coating layer comprises an inorganic particle and a binder, the first coating layer comprises a first region and a second region, the first coating layer in the first region comprises a first thickness, and the first coating layer in the second region comprises a second thickness, the first thickness is greater than the second thickness, and the area in the second region is greater than the area in the first region.

According to some examples of the present application, wherein the lithium ion battery comprises a wound electrode assembly, and the first region is disposed at a corner of the electrode assembly.

According to some examples of the present application, wherein the first region is disposed at least on the outmost separator at the corner of the electrode assembly.

According to some examples of the present application, wherein the first region is disposed on the separator of 1 to 5 circles from outside to inside at the corner of the electrode assembly.

According to some examples of the present application, wherein the first region is disposed on an outside of the separator at the corner of the electrode assembly.

According to some examples of the present application, wherein the outside of the separator faces the outmost electrode.

The beneficial technical effects of the present application are as follows:

The thickness of the first coating layer in the local region of the separator is increased, so that the local strength of the separator is improved, so the separator could meet the safety requirements for different parts of the lithium ion battery. At the same time, due to the separator having first coating layer with a enhanced thickness in partial area is used, the strength of the surface of the lithium ion battery is increased, and the thickness of the lithium ion battery is not increased, thereby improving the overall performance of the lithium ion battery.

BRIEF DESCRIPTION OF THE ACCOMPANYING DRAWINGS

DETAILED DESCRIPTION OF THE PREFERRED EXAMPLES

The examples of the present application will be described in detail in connection with the attached drawings. The description of the present application in connection with the attached drawings is to be considered as illustrative and not restrictive. The various examples may be combined with one another to form other examples not shown in the following description. In addition, the various orientation terms used in the following description are also merely illustrative and are not intended to limit the present application.

Figure 1:
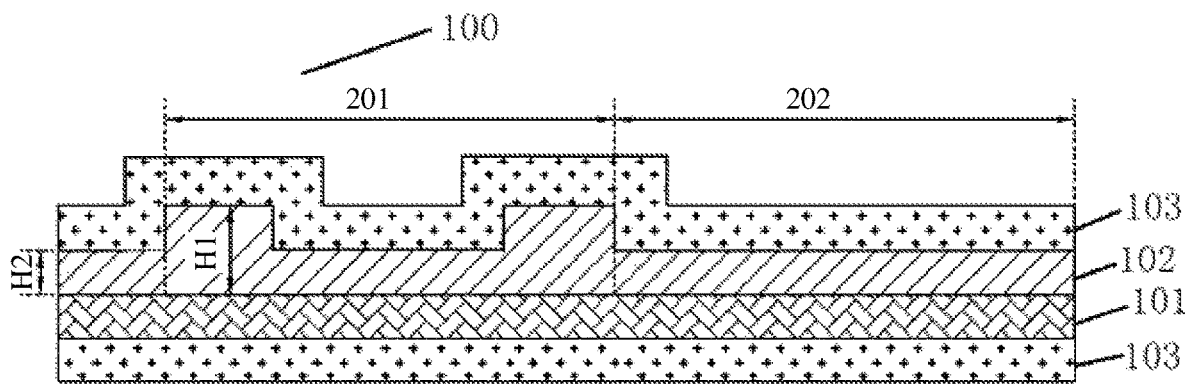
FIG. 1 is a schematic view of a separator of Example 1 of the present application.
Figure 2:
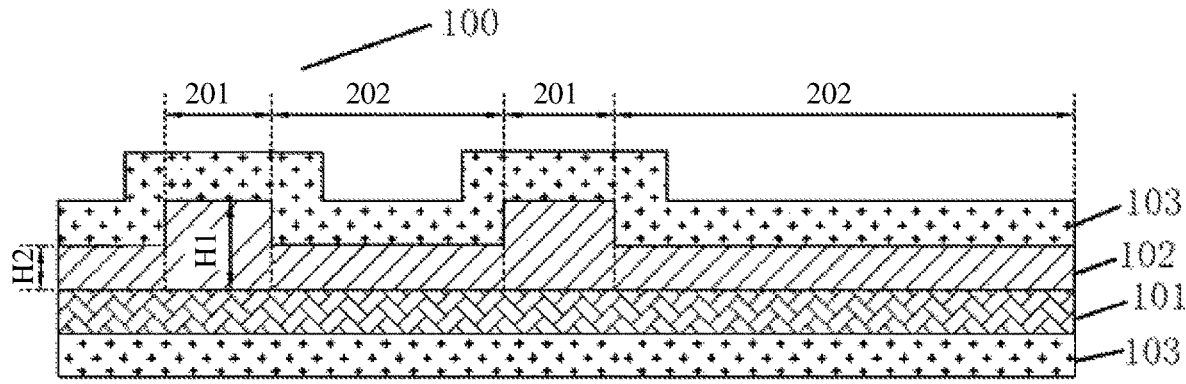
FIG. 2 is a schematic view of a separator of Example 2 of the present application.

As shown in FIGS. 1 to 4, an aspect of the present application provides a separator 100. In some examples of the present application, the separator 100 comprises a porous substrate 101 and a first coating layer 102. The first coating layer 102 is disposed on at least one surface of the porous substrate 101, and the first coating layer 102 further comprises a first region 201 and a second region 202. In some examples, as shown in FIG. 1, the thickness of the first coating layer in the first region 201 comprises a first thickness H1 and a second thickness H2, and the first thickness H1 is greater than the second thickness H2. In some examples, as shown in FIG. 2, the thickness of the first coating layer in the first region 201 only comprises the first thickness H1.

That is, the first coating layer 102 may be disposed on one or more surfaces of the porous substrate 101. And the first region 201 and the second region 202 are present in the first coating layer 102, while the first region may have one or two kinds of thicknesses. Therefore, the partial or overall portion in the first region 201 is subjected to a thickening process, i.e., the first thickness H1 in the first region 201. The separators having two kinds of thicknesses of first coating layer could be flexibly disposed in regions where the lithium ion battery requires enhanced protection to meet the higher safety requirements of lithium ion battery.

In some examples of the present application, the thickness of the first coating layer in the second region 202 is equal to the second thickness H2. That is, the thickness of the first coating layer in the second region is uniform and the thickness is the same as the second thickness H2. Thus, the separator 100 having two regions and two kinds of thicknesses of first coating layer may be protected in accordance with the safety requirements for different parts of the lithium ion battery, and may not cause an unnecessary increase in the volume of the lithium ion battery.

In some examples of the present application, the coating layers of the first thickness H1 are spaced apart. That is to say, the coating layers of the first thickness H1 may be uniformly spaced apart or may be unevenly spaced. The spacing distance and the lateral length of the coating layer of the first thickness H1 may be optimally set according to the actual application, and after the coating layer of the first thickness H1 is spaced apart, the bending ability is effectively improved. If the first region 201 is disposed at a curved portion of the components to be packaged, the bending angle or the degree of bending of the separator 100 is not adversely affected since the coating layers of the first thickness H1 are spaced apart, thereby enabling the separator 100 to fit well with the components to be packaged. Of course, it should be noted that in the present example and other examples, the lateral direction refers to the direction from left to right in the drawings.

In some examples of the present application, a distance between the coating layers of the first thickness H1 is 0.0005 to 5 mm. Configuring the spacing distance within the range of 0.0005~5 mm may not only ensure that the distribution density of the coating layer of the first thickness H1 is not too large to affect the bending, but also may not cause the performance of the separator 100 to decrease due to the distribution density of the coating layer of the first thickness H1 being too small.

In some examples of the present application, a difference between the first thickness H1 and the second thickness H2 is 0.2 to 5 μm. Controlling the difference between the first thickness H1 and the second thickness H2 at 0.2 to 5 μm may increase the partial thickness of the separator 100 and also prevent the excessive volume increase of the lithium ion battery. In other words, if the thickness difference between the first thickness H1 and the second thickness H2 is too small, the resulted effect is similar to increase the thickness of the first coating layer of the separator 100 as a whole, so that the thickness of the first coating layer which does not require thickening is correspondingly increased, thereby not only wasting the coating layer material but also reducing the energy density of the lithium ion battery. If the difference between the first thickness H1 and the second thickness H2 is too large, excessive voids may be generated when the first region 201 is bent, thereby reducing the utilization ratio inside the package space, and also causing the volume of the lithium ion battery to increase excessively, reducing the energy density of the lithium ion battery.

In some examples of the present application, the second thickness H2 is 0.2 to 20 μm. In various examples, it should be ensured that the volume of the lithium ion battery may not be increased or just increased a little. Then, the second thickness H2 should also be optimized. Designing the second thickness H2 to 0.2~20 μm may effectively ensure that the volume of the lithium ion battery may not change greatly, so that the original effect is not reduced.

In some examples of the present application, the separator 100 further comprises a second coating layer, and the second coating layer comprises at least one of an inorganic particle and a binder. That is, the second coating layer may comprise only the binder, or may comprise only the inorganic particle, and may also comprise the inorganic particle and the binder.

In some examples of the present application, the first coating layer is disposed between the porous substrate and the second coating layer. That is, additional coating layer is provided on the first coating layer. The arrangement of the second coating layer increases the thickness of the separator and enhances the performance of the separator. Of course, more than one second coating layer may be provided, as long as it may contribute to the performance improvement of the lithium ion battery.

In one or more examples of the present application, above inorganic particle comprises at least one of inorganic particles comprising silica, alumina, titania, zinc oxide, magnesium oxide, hafnium dioxide, tin oxide, zirconium oxide, yttrium oxide, silicon carbide, boehmite, magnesium hydroxide, aluminum hydroxide, calcium titanate, barium titanate, lithium phosphate, lithium titanium phosphate, lithium lanthanum titanate. These inorganic particles have high thermal stability and may improve high temperature resistance of the lithium ion battery. Of course, in other examples, the inorganic particle may further contain other compositions as long as they contribute to the performance of the separator 100.

In one or more examples, the binder comprises at least one of polymers comprising vinylidene fluoride-hexafluoropropylene copolymer, vinylidene fluoride-trichloroethylene copolymer, polyacrylic ester, polyacrylic acid, polyacrylate, polyacrylonitrile, polyvinylpyrrolidone, polyvinyl acetate, copolymer of ethylene-vinyl acetate, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, acrylonitrile-styrene-butadiene copolymer, polyvinyl alcohol, polyvinyl ether, polytetrafluoroethylene, polyhexafluoropropylene, styrene-butadiene copolymer and polyvinylidene fluoride. These polymers are capable of producing a strong binding effect, binding the inorganic particles together, or binding the separator and the electrodes together, to increase the rigidity of the packaging device. Of course, in other examples, the binder may also comprise other polymers as long as they are advantageous to enhance the performance of the separator 100.

In one or more examples, the porous substrate is a polymer film, a multilayer polymer film, or a nonwoven fabric formed of any one or more of polymers comprising polyethylene, polypropylene, polyethylene terephthalate, polybutylene terephthalate, polyphthalamide, polyester, polyacetal, polyamide, polycarbonate, polyimide, polyetheretherketone, polyaryletherketone, polyetherimide, polyamideimide, polybenzimidazole, polyethersulfone, polyphenylene ether, cyclic olefin copolymer, polyphenylene sulfide and polyethylene naphthalene. These polymers have high thermal stability and are easy to perform surface treatment, making it easy to apply to various types of the first coating layers. In addition, such polymers have good toughness and are easy to bend.

According to another aspect of the present application, a lithium ion battery 300 is provided comprising a positive electrode, a negative electrode and the separator 100 of any one of above examples. The separator of the present application is inserted between the positive electrode and the negative electrode. In one or more examples, using the separator 100 of any one of the above examples as a separator of the lithium ion battery 300 may effectively protect the lithium ion battery 300, particularly the corner 301 of the lithium ion battery 300.

In some examples of the present application, the lithium ion battery 300 comprises a wound electrode assembly with a first region 201 disposed at a corner 301 of the electrode assembly. Of course, the first region 201 may also be disposed in a non-corner region 302. As long as it is advantageous to protect the lithium ion battery 300.

In some examples of the present application, the first region 201 is disposed at least the corner region of the outmost separator of the electrode assembly 301. The lithium ion battery 300 may be sufficiently protected by disposing the first region 201 at the corner region 301 of the outmost separator. When the side of the lithium ion battery 300 is extruded or impacted, the outmost separator 100 may be the first to subject to the force, thereby providing timely protection.

In some examples of the present application, the first region is disposed at least on the separator of 1 to 5 circles from outside to inside at the corner of the electrode assembly. Controlling the number of circles in 1 to 5 circles is to strictly control for the volume of the lithium-ion battery and the maximum protection for the lithium-ion battery. The first region is disposed outside the separator at the corner of the electrode assembly, and the outside of the separator faces the outmost electrode. For example, when the outmost electrode is the positive electrode, the first region is disposed on the side of the separator at the corner of the electrode assembly wherein first region facing the positive electrode.

In above lithium ion battery 300, the positive electrode comprises a positive electrode material comprising a positive electrode material (hereinafter, sometimes referred to as "positive electrode material capable of intercalating/deintercalating lithium Li") capable of intercalating and deintercalating lithium (Li). Examples of the positive electrode material capable of intercalating/deintercalating lithium Li may comprise lithium cobaltate, lithium nickel cobalt manganese oxide, lithium nickel cobalt aluminate oxide, lithium manganese oxide, lithium ferromanganese phosphate, lithium vanadium phosphate, lithium vanadium phosphate oxide, lithium iron phosphate, lithium titanate, and lithium-rich manganese-based materials.

In the above positive electrode material, the chemical formula of lithium cobaltate may be $Li_xCo_aM1_bO_{2-c}$, wherein M1 represents at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), and silicon, and the values of x, a, b and c are respectively in the following ranges: $0.8 \leq x \leq 1.2$, $0.8 \leq a \leq 1$, $0 \leq b \leq 0.2$, $-0.1 \leq c \leq 0.2$; In the above positive electrode material, the chemical formula of lithium nickel cobalt manganate or lithium nickel cobalt aluminate may be $Li_yNi_dM2_eO_{2-f}$, wherein M2 represents at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr) and silicon (Si), and the values of y, d, e and f are respectively in the following ranges: $0.8 \leq y \leq 1.2$, $0.3 \leq d \leq 0.98$, $0.02 \leq e \leq 0.7$, $-0.1 \leq f \leq 0.2$;

In the above positive electrode material, the chemical formula of lithium manganate may be $Li_zMn_{2-g}M3_gO_{4-h}$, wherein M3 represents at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of z, g, and h are respectively in the following ranges: $0.8 \leq z \leq 1.2$, $0 \leq g \leq 1.0$ and $-0.2 \leq h \leq 0.2$.

In the above lithium ion battery, the negative electrode comprises a negative electrode material comprising the negative electrode material (hereinafter, sometimes referred to as "positive electrode material capable of intercalating/deintercalating lithium Li") capable of intercalating and deintercalating lithium (Li). Examples of the negative electrode material capable of intercalating/deintercalating lithium Li may comprise carbon materials, metal compounds, oxides, sulfides, nitrides of lithium such as $LiN_3$, lithium metal, metals which form alloys together with lithium and polymer materials.

In the above negative electrode material capable of intercalating and deintercalating lithium (Li), examples of carbon materials may comprise low graphitized carbon, easily graphitizable carbon, artificial graphite, natural graphite, mesocarbon microbeads, soft carbon, hard carbon, pyrolytic carbon, coke, vitreous carbon, organic polymer compound sintered body, carbon fiber and activated carbon. Among them, coke may comprise pitch coke, needle coke, and petroleum coke. The organic polymer compound sintered body refers to a material obtained by calcining a polymer material such as a phenol plastic or a furan resin at a suitable temperature for carbonizing, and some of these materials are classified into low graphitized carbon or easily graphitizable carbon. Examples of the polymer material may comprise polyacetylene and polypyrrole.

Further, in above negative electrode material capable of intercalating/deintercalating lithium Li, a material whose charging and discharging voltages are close to the charging and discharging voltages of lithium metal is selected. This is because the lower the charging and discharging voltage of the negative electrode material, the easier the battery is to have a higher energy density. Among them, the negative electrode material may be selected from carbon materials because their crystal structures are only slightly changed upon charging and discharging, and therefore, good cycle characteristics as well as large charge and discharge capacities may be obtained. In particular, graphite may be selected because it gives a large electrochemical equivalent and a high energy density.

In addition, the negative electrode material capable of intercalating/deintercalating lithium (Li) may comprise elemental lithium metal, metal elements and semimetal elements capable of forming an alloy together with lithium (Li), and alloys and compounds of such elements. In particular, they are used together with carbon materials because in this case, good cycle characteristics as well as high energy density may be obtained. In addition to alloys comprising two or more metal elements, the alloys used herein also comprise alloys comprising one or more metal elements and one or more semi-metal elements. The alloy may be in the form of a solid solution, a eutectic crystal (eutectic mixture), an intermetallic compound, and a mixture thereof.

Examples of above metal element and the semi-metal element may comprise tin (Sn), plumbum (Pb), aluminum (Al), indium (In), silicon (Si), zinc (Zn), antimony (Sb), bismuth (Bi), Cadmium (Cd), magnesium (Mg), boron (B), gallium (Ga), germanium (Ge), arsenic (As), silver (Ag), zirconium (Zr), yttrium (Y), and hafnium (Hf). Examples of above alloys and compounds may comprise a material having a chemical formula $Ma_sMb_tLi_u$ and a material having a chemical formula $Ma_pMc_qMd_r$. In these chemical formulae, Ma denotes at least one of a metal element and a semi-metal element capable of forming an alloy together with lithium; Mb denotes at least one of a metal element and a semi-metal element other than lithium and Ma; Mc denotes at least one of the non-metallic elements; Md denotes at least one of a metal element and a semi-metal element other than Ma; and s, t, u, p, q and r meets $s>0$, $t \geq 0$, $u \geq 0$, $p>0$, $q>0$ and $r \geq 0$.

Further, an inorganic compound not comprising lithium (Li) such as $MnO_2$, $V_2O_5$, $V_6O_{13}$, NiS, and MoS may be used in the negative electrode.

The above lithium ion battery further comprises an electrolyte which may be one or more of a gel electrolyte, a solid electrolyte and an electrolyte, and the electrolyte comprises a lithium salt and a non-aqueous solvent.

The above lithium salt comprises at least one selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, the lithium salt selects $LiPF_6$ because it may give high ionic conductivity and improved cycle characteristics.

The above non-aqueous solvent may be a carbonate compound, a carboxylate compound, an ether compound, other organic solvents, or a combination thereof.

In the above non-aqueous solvent, the carbonate compound may be a chain carbonate compound, a cyclic carbonate compound, a fluorocarbonate compound, or a combination thereof. Among them, examples of the chain carbonate compound are diethyl carbonate (DEC), dimethyl carbonate (DMC), dipropyl carbonate (DPC), methylpropyl carbonate (MPC), ethylene propyl carbonate (EPC), methyl ethyl carbonate (MEC) and combinations thereof.

Among them, examples of the cyclic carbonate compound are ethylene carbonate (EC), propylene carbonate (PC), butylene carbonate (BC), vinylidene ethylene carbonate (VEC), and combinations thereof. Among them, examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and combinations thereof.

In the above non-aqueous solvent, examples of the carboxylate compound are methyl acetate, ethyl acetate, n-propyl acetate, t-butyl acetate, methyl propionate, ethyl propionate, γ-butyrolactone, azlactone, valerolactone, mevalonolactone, caprolactone, methyl formate and combinations thereof.

In the above non-aqueous solvent, examples of the ether compounds are dibutyl ether, tetraglyme, diglyme, 1,2-dimethoxyethane, 1,2-diethoxyethane, ethoxymethoxyethane, 2-methyltetrahydrofuran, tetrahydrofuran, and combinations thereof.

In the above non-aqueous solvent, examples of other organic solvents are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate and phosphate, and combinations thereof.

The present application will be further described below in conjunction with the drawings. At the same time, it should be noted that when the region of the separator corresponding to the corner of the electrode assembly comprises a plurality of protrusions, the first region 201 refers to a region between the leftmost portion of the first protrusion of the first coating layer 102 corresponding to the corner of the electrode assembly and the rightmost portion of the last protrusion; when the region of the separator corresponding to the corner of the electrode assembly comprises only one protrusion, the first region 201 refers to the region where the protrusion is located. The second region refers to a region of uniform thickness other than the first region.

As shown in FIG. 1, the first coating layer 102 is composed of an inorganic particle and a binder. This layer is provided on the surface of the porous substrate 101. The first coating layer 102 having the first thickness H1 is a protrusion, and the cross-section of the protrusion is a rectangle. Of course, the cross-section may also be triangular or semi-circular or other polygons. That is, as long as the protrusion increases the thickness of the first coating layer, the shape of the protrusion may be arbitrary. The first coating layer 102 comprises a first region 201 and a second region 202. The thickness of the first coating layer in the second region is uniform and the thickness is the same as the second thickness H2 in the first region. Moreover, a second coating layer 103 is further disposed on the first coating layer 102. The second coating layer 103 may be an inorganic particle, a binder, or a mixture of a binder and inorganic particles. The second coating layer 103 increases the thickness of the separator 100. Further, the second coating layer 103 is also provided on the other surface of the porous substrate 101, and the composition of the two second coating layers 103 may be the same or different.

Additionally, in various examples, the shape of the protrusion comprises hemispheres and cubes or only hemispheres. Thus, the bending performance in the first region 201 is enhanced, so that it may be applied to a lithium ion battery of a more complicated structure or shape.

In the example shown in FIG. 1, the second coating layer 103 is applied along the outer contour of the first coating layer 102 and retains the original height difference between the first thickness H1 and the second thickness H2. Of course, the original height difference may be changed when the binder is applied, and is not limited herein. In addition, the arrangement for the second coating layer 103 also increases the overall thickness of the separator 100.

As shown in FIG. 2, the first region 201 of the first coating layer 102 comprises only a single protrusion. Other details are the same as those shown in FIG. 1, and will not be repeated here. It should be noted that the width in the first region 201 in the drawings is merely illustrative and does not represent the actual width. For example, the widths in the first regions 201 in FIGS. 1 and 2 may be the same or different.

Figure 3:
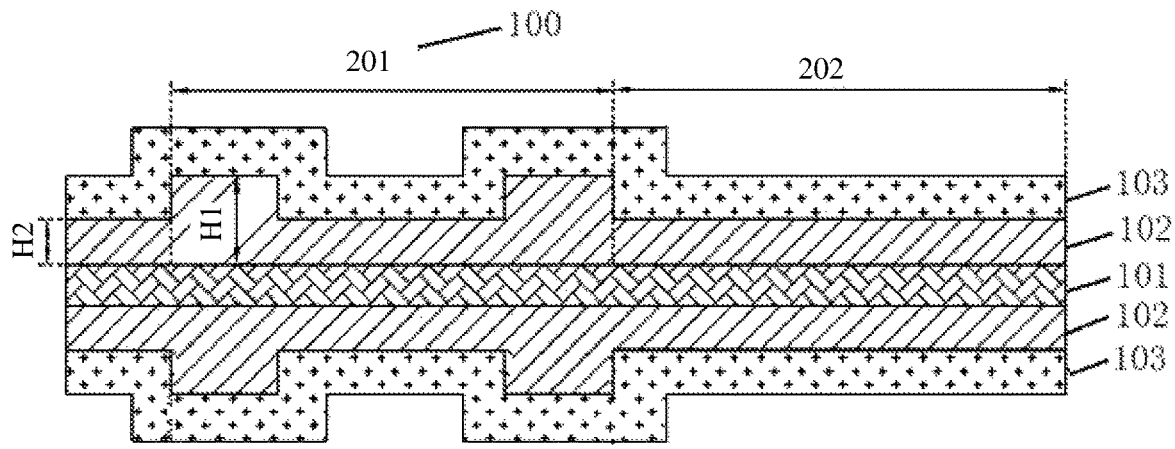
FIG. 3 is a schematic view of a separator of Example 3 of the present application.

As shown in FIG. 3, the first coating layer 102 is simultaneously disposed on both sides of the porous substrate 101, and two second coating layers 103 are further disposed. The first coating layer 102 is disposed between the porous substrate 101 and the second coating layer 103. In the present example, the thickness of the first coating of the separator 100 is locally increased, resulting in a plurality of protrusions, so that it may be applied to more complex environments.

Figure 4:
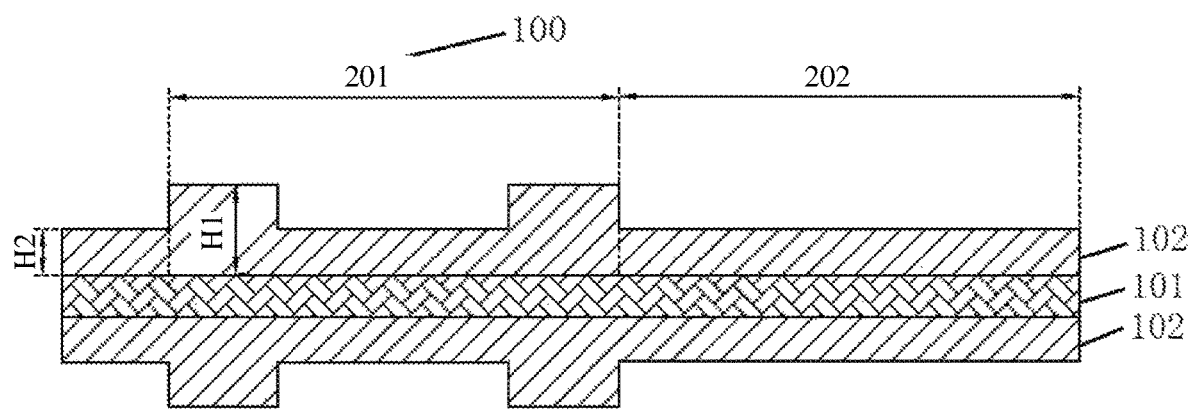
FIG. 4 is a schematic view of a separator of Example 4 of the present application.

As shown in FIG. 4, the first coating layer 102 is disposed on both sides of the porous substrate 101. In the present example, the thickness of the separator 100 is increased to produce a plurality of protrusions. The gap between the protrusions contributes to the bending at the corners of the electrode assembly. In addition, the thickening of the separator at the corners of the electrode assembly may not additionally increase the volume of the lithium ion battery.

Figure 5:
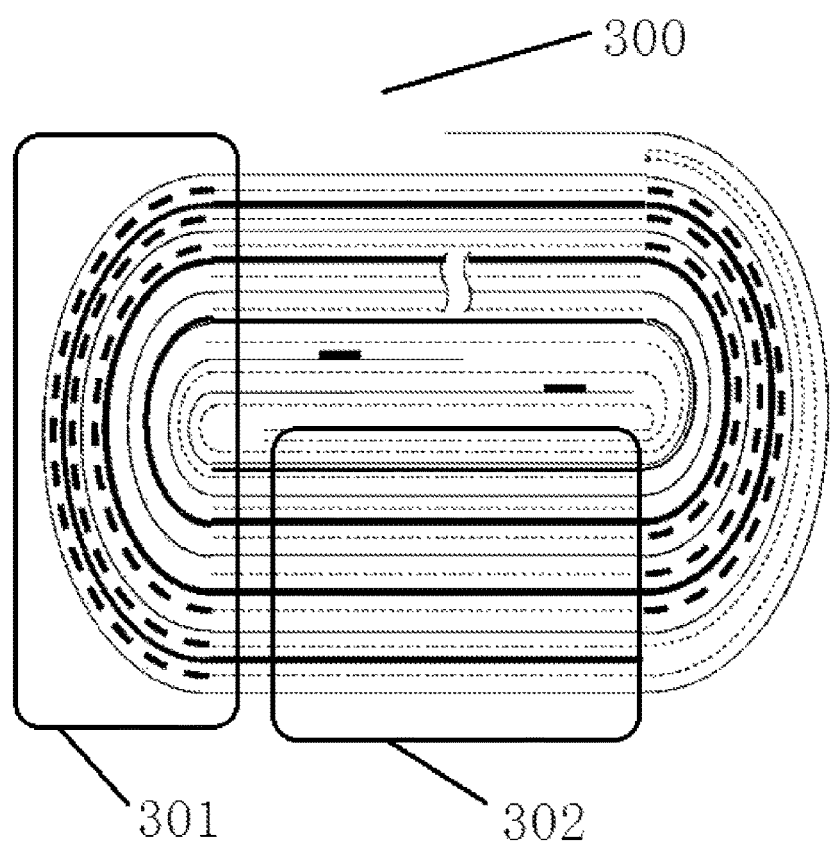
FIG. 5 is a schematic view of a wound electrode assembly of the present application.

As shown in FIG. 5, the positive electrode, the negative electrode, and the separator 100 are wound into an electrode assembly. The first region 201 is disposed at a corner 301 and the second region 202 is disposed at a non-corner region 302.

Hereinafter, a preparation of the lithium ion battery is described in conjunction with specific examples. Those skilled in the art will understand that the preparation method described in the present application is merely an example, and any other suitable preparation methods are within the scope the present application.

Example 1

(1) Preparation of the Positive Electrode:

A positive electrode material lithium cobaltate ($LiCoO_2$), a conductive agent Super P, and a binder polyvinylidene fluoride are mixed at a weight ratio of 97.8:1:1.2, added with N-methylpyrrolidone (NMP), stirred under a vacuum mixer until the system is uniformly transparent, to obtain a positive electrode slurry, wherein the solid content of the positive electrode slurry is 77 wt %; the positive electrode slurry is uniformly coated on the positive electrode current collector aluminum foil; the aluminum foil is dried at 85° C., and then subjected to cold pressing, trimming, cutting, and slitting, and then dried under vacuum at 85° C. for 4 hours, to obtain a positive electrode.

(2) Preparation of the Negative Electrode:

A negative electrode material artificial graphite, the conductive agent Super P, a thickener sodium carboxymethyl cellulose (CMC), and a binder styrene-butadiene rubber (SBR) are mixed according to the weight ratio of 97.7:1:0.3:1, added with a deionized water, stirred under a vacuum mixer, to obtain a negative electrode slurry, wherein the solid content of the negative electrode slurry is 49 wt %; the negative electrode slurry is uniformly coated on the negative electrode current collector copper foil; the copper foil is dried at 85° C., and then subjected to cold pressing, trimming, cutting, and slitting, and then dried under vacuum at 120° C. for 12 hours, to obtain a negative electrode.

(3) Preparation of Separator:

An inorganic particulate alumina and a binder polyacrylonitrile are added to the deionized water in an amount of 91:9 by mass ratio to form a slurry while the solid content of the slurry being 45%; then, the amount of the slurry is controlled by dimple coating to apply the slurry onto one side of a 7 μm thick porous substrate (polyethylene), and after drying in an oven, a separator having a first coating layer is obtained. Among them, the first coating layer has a first region and a second region; the thickness of the first coating layer in the first region comprises a first thickness, and the thickness of the first coating layer in the second region comprises a second thickness; the first thickness is 5 μm, the second thickness is 3 μm, and the thickness of the first coating layer in the second region is 3 μm; the coating layers of the first thickness are spaced apart, and the distance between the coating layers of the first thickness is 0.5 mm.

Polyvinylidene fluoride (PVDF) and polyacrylonitrile are uniformly mixed with deionized water at a mass ratio of 9:1, and the final slurry has a solid content of 10% to 15%; then, the slurry is sprayed onto both sides of the prepared separator having the first coating layer, the second coating each having a thickness of 2 μm, and after drying in an oven, a second coating layer is formed on the first coating layer, to obtain a final separator.

(4) Preparation of Electrolyte:

A lithium salt $LiPF_6$ and a non-aqueous organic solvent (Ethylene carbonate (EC): diethyl carbonate (DEC): propylene carbonate (PC): propyl propionate (PP): vinylene carbonate (VC)=20:30:20:28:2, mass ratio) are prepared at a mass ratio of 8:92 as an electrolyte of a lithium ion battery.

(5) Preparation of Lithium Ion Battery:

The positive electrode, the separator and the negative electrode are stacked in order so that the separator plays a role of isolation between the positive electrode and the negative electrode, and then are wound to obtain an electrode assembly, wherein the first region of the first coating layer is disposed outside of the outmost separator at the corner of the electrode assembly, and the outside of the separator faces the outmost positive electrode; after being welded with electrode tabs, the electrode assembly is placed in a outer packaging foil made of aluminum plastic film, and the prepared electrolyte is injected into the dried electrode assembly, and then subjected to processes such as vacuum encapsulation, static, formation (charged with a constant current of 0.02 C to 3.3V, then charged to 3.6V with a constant current of 0.1 C), shaping, capacity testing to obtain a soft package lithium ion battery.

Example 2

The preparation process of the lithium ion battery is the same as that of Example 1, except that the thickness of the first coating layer in the first region comprises only the first thickness, as shown in FIG. 2.

Example 3

The preparation process of the lithium ion battery is the same as that in Example 1, except that the slurry of the first coating layer is applied to both sides of a 7 μm thick porous substrate (polyethylene).

Example 4

The preparation process of the lithium ion battery is the same as that in Example 1, except that the slurry of the first coating layer is applied to both sides of a 7 μm thick porous substrate (polyethylene). Additionally, there is no second coating layer formed on the first coating layer.

Example 5

The preparation process of the lithium ion battery is the same as that in Example 1, except that the first thickness is 3.2 μm.

Example 6

The preparation process of the lithium ion battery is the same as that in Example 1, except that the first thickness is 4.3 μm.

Example 7

The preparation process of the lithium ion battery is the same as that in Example 1, except that the first thickness is 6.3 μm.

Example 8

The preparation process of the lithium ion battery is the same as that in Example 1, except that the first thickness is 7.1 μm.

Example 9

The preparation process of the lithium ion battery is the same as that in Example 1, except that the first thickness is 8.0 μm.

Example 10

The preparation process of the lithium ion battery is the same as that in Example 1, except that the distance between the coating layers of the first thickness is 0.0005 mm.

Example 11

The preparation process of the lithium ion battery is the same as that in Example 1, except that the distance between the coating layers of the first thickness is 0.002 mm.

Example 12

The preparation process of the lithium ion battery is the same as that in Example 1, except that the distance between the coating layers of the first thickness is 0.005 mm.

Example 13

The preparation process of the lithium ion battery is the same as that in Example 1, except that the distance between the coating layers of the first thickness is 0.05 mm.

Example 14

The preparation process of the lithium ion battery is the same as that in Example 1, except that the distance between the coating layers of the first thickness is 1.8 mm.

Example 15

The preparation process of the lithium ion battery is the same as that in Example 1, except that the distance between the coating layers of the first thickness is 5 mm.

Example 16

The preparation process of the lithium ion battery is the same as that in Example 1, except that the first region of the first coating layer is disposed at the outside of the outmost 2 circles of the separator at the corner of the electrode assembly, and the outside of the separator faces the outmost positive electrode.

Example 17

The preparation process of the lithium ion battery is the same as that in Example 1, except that the first region of the first coating layer is disposed at the outside of the outmost 3 circles of the separator at the corner of the electrode assembly, and the outside of the separator faces the outmost positive electrode.

Example 18

The preparation process of the lithium ion battery is the same as that in Example 1, except that the first region of the first coating layer is disposed at the outside of the outmost 4 circles of the separator at the corner of the electrode assembly, and the outside of the separator faces the outmost positive electrode.

Example 19

The preparation process of the lithium ion battery is the same as that in Example 1, except that the first region of the first coating layer is disposed at the outside of the outmost 5 circles of the separator at the corner of the electrode assembly, and the outside of the separator faces the outmost positive electrode.

Comparative Example 1

The preparation process of the lithium ion battery is the same as that in Example 1, except that the first coating layer comprises only a uniform second thickness, and the second thickness is 3 μm.

Comparative Example 2

The preparation process of the lithium ion battery is the same as that in Example 1, except that the slurry of the first coating layer is applied uniformly to both sides of a 7 μm thick porous substrate (polyethylene), the first coating layer comprises only a uniform second thickness, and the second thickness is 3 μm.

Comparative Example 3

The preparation process of the lithium ion battery is the same as that in Example 1, except that the slurry of the first coating layer is applied uniformly to both sides of a 7 μm thick porous substrate (polyethylene), the first coating layer comprises only a uniform second thickness, and the second thickness is 3 μm. Additionally, there is no second coating layer formed on the first coating layer.

Next, the test process of the lithium ion battery will be described.

1. Test for the thickness of the electrode assembly:

100 electrode assemblies obtained in each of Comparative Examples and Examples are taken for thickness measurement, and the average value is taken as the thickness of the electrode assembly.

2. Test for the width of the electrode assembly:

100 electrode assemblies obtained in each of Comparative Examples and Examples are taken for thickness measurement, the width test is performed with an optical projector, and the average value is taken as the width of the electrode assembly.

3. Test method of edge needling:

Taking 50 electrode assemblies for edge needling test, puncturing at a speed of 40 mm/s with 4 mm steel nails at 3 to 5 mm from the edge of the electrode assembly, after the temperature of the electrode assembly drops to 55° C., the nail is pulled out; if the electrode assembly does not smoke, does not catch fire, does not explode, the test is passed.

Table 1 shows parameters and results of Examples and Comparative Examples.

TABLE 1

| | Position of first coating layer | Position of second coating layer | First thickness (μm) | Second thickness (μm) | Distance between coating layers of first thickness (mm) | Position of the first region at the corner | Thickness of electrode assembly (mm) | Width of electrode assembly (mm) | Pass rate for edge needling test |
|---|---|---|---|---|---|---|---|---|---|
| Example 1 | Single side (facing the outmost electrode) | Both sides | 5 | 3 | 0.5 | Outmost | 4.101 | 61.107 | 45/50 |

TABLE 1-continued

|  | Position of first coating layer | Position of second coating layer | First thickness (μm) | Second thickness (μm) | Distance between coating layers of first thickness (mm) | Position of the first region at the corner | Thickness of electrode assembly (mm) | Width of electrode assembly (mm) | Pass rate for edge needling test |
|---|---|---|---|---|---|---|---|---|---|
| Example 2 | Single side (facing the outmost electrode) | Both sides | 5 | 3 | 0 | Outmost | 4.101 | 61.107 | 44/50 |
| Example 3 | Both sides | Both sides | 5 | 3 | 0.5 | Outmost | 4.192 | 61.201 | 49/50 |
| Example 4 | Both sides | / | 5 | 3 | 0.5 | Outmost | 4.132 | 61.141 | 47/50 |
| Example 5 | Single side (facing the outmost electrode) | Both sides | 3.2 | 3 | 0.5 | Outmost | 4.101 | 61.103 | 41/50 |
| Example 6 | Single side (facing the outmost electrode) | Both sides | 4.3 | 3 | 0.5 | Outmost | 4.101 | 61.106 | 43/50 |
| Examples | Single side (facing the outmost electrode) | Both sides | 5 | 3 | 0.5 | Outmost | 4.101 | 61.107 | 45/50 |
| Example 7 | Single side (facing the outmost electrode) | Both sides | 6.3 | 3 | 0.5 | Outmost | 4.101 | 61.109 | 49/50 |
| Example 8 | Single side (facing the outmost electrode) | Both sides | 7.1 | 3 | 0.5 | Outmost | 4.101 | 61.111 | 50/50 |
| Example 9 | Single side (facing the outmost electrode) | Both sides | 8.0 | 3 | 0.5 | Outmost | 4.101 | 61.113 | 50/50 |
| Example 2 | Single side (facing the outmost electrode) | Both sides | 5 | 3 | 0 | Outmost | 4.101 | 61.107 | 44/50 |
| Example 10 | Single side (facing the outmost electrode) | Both sides | 5 | 3 | 0.0005 | Outmost | 4.101 | 61.107 | 45/50 |
| Example 11 | Single side (facing the outmost electrode) | Both sides | 5 | 3 | 0.002 | Outmost | 4.101 | 61.107 | 49/50 |
| Example 12 | Single side (facing the outmost electrode) | Both sides | 5 | 3 | 0.005 | Outmost | 4.101 | 61.107 | 50/50 |
| Example 13 | Single side (facing the outmost electrode) | Both sides | 5 | 3 | 0.05 | Outmost | 4.101 | 61.107 | 47/50 |
| Example 1 | Single side (facing the outmost electrode) | Both sides | 5 | 3 | 0.5 | Outmost | 4.101 | 61.107 | 41/50 |
| Example 14 | Single side (facing the outmost electrode) | Both sides | 5 | 3 | 1.8 | Outmost | 4.101 | 61.107 | 36/50 |
| Example 15 | Single side (facing the outmost electrode) | Both sides | 5 | 3 | 5 | Outmost | 4.101 | 61.107 | 28/50 |
| Example 1 | Single side (facing the outmost electrode) | Both sides | 5 | 3 | 0.5 | Outmost | 4.101 | 61.107 | 45/50 |
| Example 16 | Single side (facing the outmost electrode) | Both sides | 5 | 3 | 0.5 | Outmost 2 circles | 4.101 | 61.107 | 48/50 |

TABLE 1-continued

|  | Position of first coating layer | Position of second coating layer | First thickness (μm) | Second thickness (μm) | Distance between coating layers of first thickness (mm) | Position of the first region at the corner | Thickness of electrode assembly (mm) | Width of electrode assembly (mm) | Pass rate for edge needling test |
|---|---|---|---|---|---|---|---|---|---|
| Example 17 | Single side (facing the outmost electrode) | Both sides | 5 | 3 | 0.5 | Outmost 3 circles | 4.101 | 61.107 | 49/50 |
| Example 18 | Single side (facing the outmost electrode) | Both sides | 5 | 3 | 0.5 | Outmost 4 circles | 4.101 | 61.107 | 50/50 |
| Example 19 | Single side (facing the outmost electrode) | Both sides | 5 | 3 | 0.5 | Outmost 5 circles | 4.101 | 61.107 | 50/50 |
| Comparative Example 1 | Single side (facing the outmost electrode) | Both sides | / | 3 | / | / | 4.101 | 61.103 | 15/50 |
| Comparative Example 2 | Both sides | Both sides | / | 3 | / | / | 4.192 | 61.196 | 23/50 |
| Comparative Example 3 | Both sides | / | / | 3 | / | / | 4.132 | 61.137 | 19/50 |

By comparing Examples 1-2, 5-19 and Comparative Example 1, Example 3 and Comparative Example 2, Example 4 and Comparative Example 3, it is known that by locally thickening the first coating layer of the separator, the pass rate for edge needling is significantly improved, but there is no significant difference for the thickness and width of the electrode assembly, so there is no significant influence on the energy density of the electrode assembly.

By comparing Examples 1 and 5-9, it is known that when the difference between the first thickness and the second thickness is in the range of 0.2 to 5 μm, there is no significant difference for the thickness and width of the electrode assembly and the pass rate for edge needling gradually increases as the difference between the first thickness and the second thickness increases.

By comparing Examples 1-2 and 10-15, it is known that when the distance between the coating layers of the first thickness is in the range of 5 μm or less, there is no significant difference for the thickness and width of the electrode assembly and the pass rate for edge needling first increases and then decreases as the distance between the coating layers of the first thickness increases.

By comparing Examples 1 and 16-19, it is known that as the number of the outmost circles at the corner in which the first region is located increases, there is no significant difference for the thickness and width of the electrode assembly and the pass rate for edge needling gradually increases.

The foregoing is merely illustrative of the preferred examples of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. A lithium ion battery, comprising:
   a positive electrode;
   a negative electrode;
   and a separator comprising:
   a porous substrate; and
   a first coating layer disposed on at least one surface of the porous substrate and the first coating layer directly contacts with the at least one surface of the porous substrate; the first coating layer comprises an inorganic particle and a binder, the first coating layer comprises a first region and a second region, the first coating layer in the first region comprises a first thickness, and the first coating layer in the second region comprises a second thickness, the bottom surface of the first coating layer in the first region comprising the first thickness and the bottom surface of the first coating layer in the second region comprising the second thickness are coplanar, the first thickness is greater than the second thickness, and an area of the second region is greater than an area of the first region,
   wherein the first region and the second region form the first coating layer and are coplanar, both directly facing, and being formed on, the porous substrate,
   wherein a difference between the first thickness and the second thickness is 0.2 to 5 μm and
   wherein the first coating layer is configured such that the first region forms one or more protrusions and that the first region and the second region do not overlap.

2. The lithium ion battery according to claim 1, wherein the first region is disposed at least on the outmost separator at the corner of the electrode assembly.

3. The lithium ion battery according to claim 2, wherein the first region is disposed on the separator of 1 to 5 circles from outside to inside at the corner of the electrode assembly.

4. The lithium ion battery according to claim 1, wherein the first region is disposed on an outside of the separator at the corner of the electrode assembly.

5. The lithium ion battery according to claim 4, wherein the outside of the separator faces the outmost electrode.

6. The lithium ion battery according to claim 1, wherein the first region and the second region are alternately disposed.

7. The lithium ion battery according to claim 1, wherein the first coating layer in the first region further comprises the second thickness.

8. The lithium ion battery according to claim 7, wherein the first coating layers of the first thickness are spaced apart.

9. The lithium ion battery according to claim 8, wherein a distance between the first coating layers of the first thickness is 0.0005 to 5 mm.

10. The lithium ion battery according to claim 1, wherein the second thickness is 0.2 to 20 μm.

11. The lithium ion battery according to claim 1, wherein the separator further comprises a second coating layer, and the second coating layer comprises at least one of an inorganic particle or a binder.

12. The lithium ion battery according to claim 11, wherein the first coating layer is disposed between the porous substrate and the second coating layer.

13. The lithium ion battery according to claim 1, wherein the inorganic particle comprises at least one of inorganic particles comprising silica, alumina, titania, zinc oxide, magnesium oxide, hafnium dioxide, tin oxide, zirconium oxide, yttrium oxide, silicon carbide, boehmite, magnesium hydroxide, aluminum hydroxide, calcium titanate, barium titanate, lithium phosphate, lithium titanium phosphate, lithium lanthanum titanate.

14. The lithium ion battery according to claim 11, wherein the inorganic particle comprises at least one of inorganic particles comprising silica, alumina, titania, zinc oxide, magnesium oxide, hafnium dioxide, tin oxide, zirconium oxide, yttrium oxide, silicon carbide, boehmite, magnesium hydroxide, aluminum hydroxide, calcium titanate, barium titanate, lithium phosphate, lithium titanium phosphate, lithium lanthanum titanate.

15. The lithium ion battery according to claim 1, wherein the binder comprises at least one of polymers comprising vinylidene fluoride-hexafluoropropylene copolymer, vinylidene fluoride-trichloroethylene copolymer, polyacrylic ester, polyacrylic acid, polyacrylate, polyacrylonitrile, polyvinylpyrrolidone, polyvinyl acetate, copolymer of ethylene-vinyl acetate, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, acrylonitrile-styrene-butadiene copolymer, polyvinyl alcohol, polyvinyl ether, polytetrafluoroethylene, polyhexafluoropropylene, styrene-butadiene copolymer and polyvinylidene fluoride.

16. The lithium ion battery according to claim 11, wherein the binder comprises at least one of polymers comprising vinylidene fluoride-hexafluoropropylene copolymer, vinylidene fluoride-trichloroethylene copolymer, polyacrylic ester, polyacrylic acid, polyacrylate, polyacrylonitrile, polyvinylpyrrolidone, polyvinyl acetate, copolymer of ethylene-vinyl acetate, polyimide, polyethylene oxide, cellulose acetate, cellulose acetate butyrate, cellulose acetate propionate, cyanoethyl amylopectin, cyanoethyl polyvinyl alcohol, cyanoethyl cellulose, cyanoethyl sucrose, amylopectin, sodium carboxymethyl cellulose, lithium carboxymethyl cellulose, acrylonitrile-styrene-butadiene copolymer, polyvinyl alcohol, polyvinyl ether, polytetrafluoroethylene, polyhexafluoropropylene, styrene-butadiene copolymer and polyvinylidene fluoride.

17. The lithium ion battery according to claim 1, wherein the porous substrate is a polymer film, a multilayer polymer film, or a nonwoven fabric formed of any one or more of polymers compnsmg polyethylene, polypropylene, polyethylene terephthalate, polybutylene terephthalate, polyphthalamide, polyester, polyacetal, polyamide, polycarbonate, polyimide, polyetheretherketone, polyaryletherketone, polyetherimide, polyamideimide, poly benzimidazole, polyethersulfone, polyphenylene ether, cyclic olefin copolymer, polyphenylene sulfide and polyethylene naphthalene.

* * * * *